UNITED STATES PATENT OFFICE.

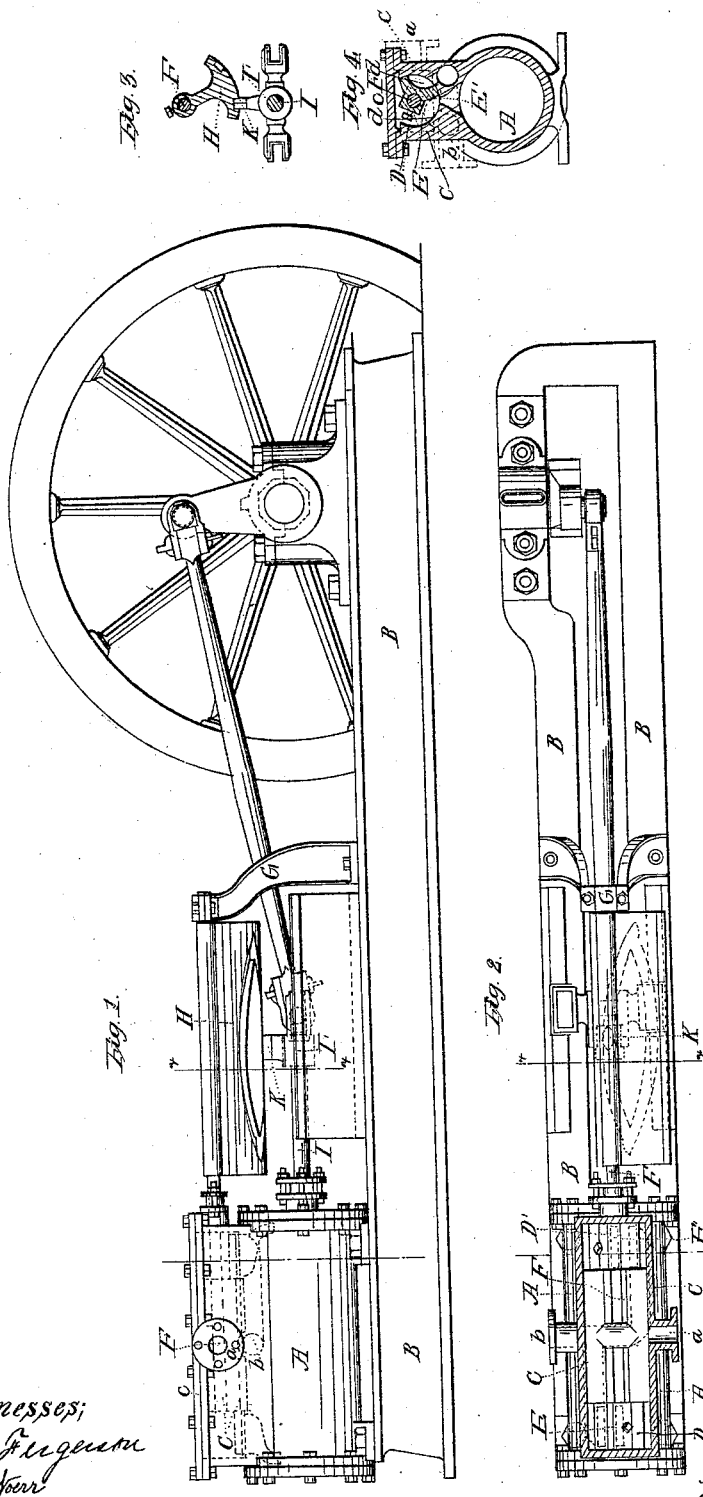

WILLIAM DENNISON, OF WASHINGTON, DISTRICT OF COLUMBIA.

IMPROVEMENT IN VALVE-GEARS FOR STEAM-ENGINES.

Specification forming part of Letters Patent No. 58,074, dated September 18, 1866.

*To all whom it may concern:*

Be it known that I, WILLIAM DENNISON, of the city of Washington, in the District of Columbia, have invented a new and useful Improvement in the Manner of Operating the Valves of Steam-Cylinders; and I do hereby declare the following to be a full, clear, and exact description thereof, reference being had to the annexed drawings, making part of this specification, in which—

Figure 1 is a side elevation of an engine, showing my improvement. Fig. 2 is a plan or top view of the same. Fig. 3 is a section on the line $x\,x$ of Figs. 1 and 2. Fig. 4 is a section on the line —— of Figs. 1 and 2.

A is a steam-cylinder, of ordinary construction, resting on a bed-plate, B, and secured to it by bolts and nuts. C is the steam-chest, having a supply-opening at $a$ and an escape at $b$. In Fig. 2 the top plate, $c$, of the steam-chest is removed to show plainly the interior.

At each end of the steam-chest is a concave, D D', from the inner surface of which open the steam-ports and escape-channels. The steam-ports are in the bottom and centers of the concaves, while the escape-opening from one concave is on the opposite side of the steam-port from the escape-opening in the other concave. These openings and their connections are shown in dotted lines, Figs. 1, 2, and 4.

In each concave, and fitted steam-tight, is a block or valve, E E', having a chamber, $d$, Fig. 4, through which, when the valve is in a proper position, the steam may flow from the cylinder into the escape openings and channels. The valves E E' are secured by set-screws, or other devices, upon a rock-shaft, F, which passes through a stuffing-box in the front end of the steam-chest, and has its extreme forward end supported in a journal-box on the standard G.

The valves are so arranged upon the rock-shaft as that by its vibration the steam-ports are alternately opened to communication with the steam-chest, and closed from it and opened to connect with the escape-openings through the chambers $d$ in the valves.

The vibration of the rock-shaft is effected by means of the cam H, which is a segment of a cylinder grooved upon its convex face, as seen in dotted lines in Fig. 2 and in section in Fig. 3, firmly secured upon the rock-shaft.

Upon the piston-rod I, or upon the cross-head I', is a stud, K, projecting into the groove in the cam H.

When the piston is at half-stroke, as represented in the drawings, one of the steam-ports is wide open for the reception of steam from the steam-chest, while the other is connected with the escape.

As the piston-rod moves through the last half of the stroke the stud K acts against the sides of the groove, causing the cam to swing a distance equal to half the space between the two parts of the groove.

When the stroke has been completed the valve that was open has been shut and the other has commenced to open.

As the piston moves back the stud takes hold on the other part of the groove in the cam, swinging the valve more widely open, until the half-stroke is made, when the action of the cam is reversed, as is also that of the valves.

I do not intend to confine myself to any particular form or degree of curvature of the grooves in the cam H, as different engines require different movements of their valves; but the cam will be arranged to give such varying movements of the valves as may be deemed most expedient.

The above-described arrangement of valves and of the cam with reference to the cylinder is applicable to water, air, and gas engines as well as to steam-engines, as described in the specification.

Having thus fully described my invention, what I claim as new therein, and desire to secure by Letters Patent, is—

1. The cam H, arranged to operate in such a way as to cause the valves of steam-cylinders to move continuously, while the piston of the steam-cylinder is in motion, by a stud or pin on the piston-rod, or other attachment producing the same result, substantially as set forth.

2. A steam-cylinder having its openings and valves arranged on a line with the axes of the cylinder, substantially in the manner set forth.

3. The cam H, the rock-shaft F, and the steam-cylinder, with its steam-valves E E', combined and operating as and for the purpose set forth.

Witnesses:     WILLIAM DENNISON.
   W. P. FERGUSON,
   A. B. NOERR.